Jan. 12, 1937.  M. GRÜNTHAL  2,067,568
DIE FOR AUTOMATICALLY WORKING MECHANICAL FORGING MACHINES
FOR MANUFACTURING OF SEAMLESS HOLLOW BODIES
Filed Jan. 25, 1935  2 Sheets-Sheet 1

Inventor:
Moritz Grünthal
By [signature]
Attorney.

Jan. 12, 1937.                M. GRÜNTHAL                 2,067,568
            DIE FOR AUTOMATICALLY WORKING MECHANICAL FORGING MACHINES
                   FOR MANUFACTURING OF SEAMLESS HOLLOW BODIES
                        Filed Jan. 25, 1935         2 Sheets-Sheet 2
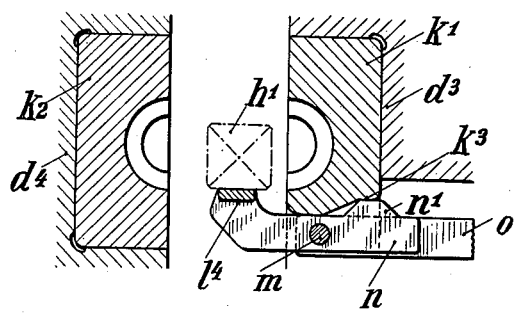
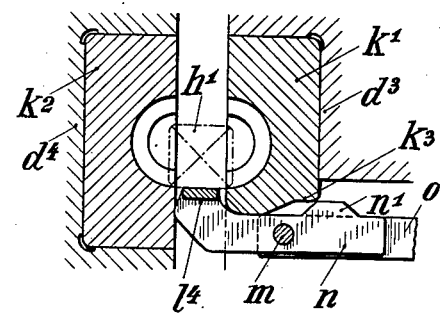
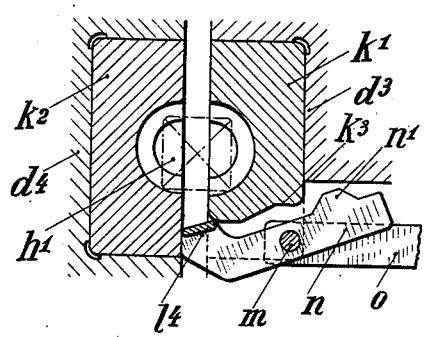
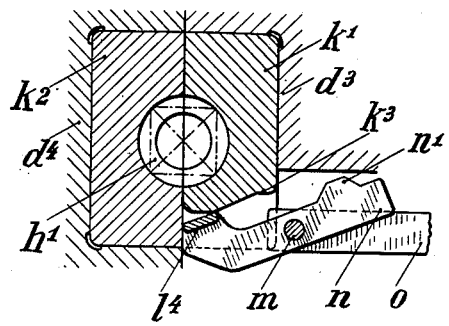
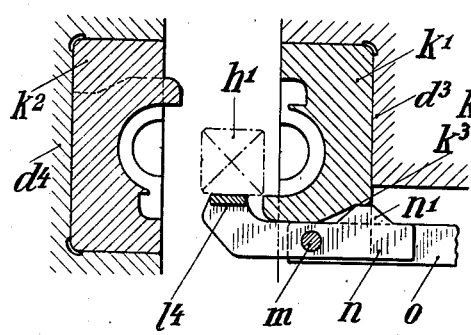
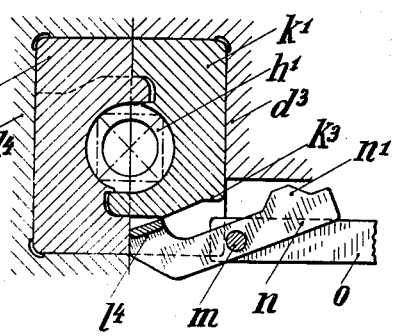
Inventor:
Moritz Grünthal
By
Attorney.

Patented Jan. 12, 1937

2,067,568

UNITED STATES PATENT OFFICE 2,067,568

DIE FOR AUTOMATICALLY WORKING MECHANICAL FORGING MACHINES FOR MANUFACTURING OF SEAMLESS HOLLOW BODIES

Moritz Grünthal, Dusseldorf, Germany

Application January 25, 1935, Serial No. 3,520
In Germany February 8, 1932

11 Claims. (Cl. 78—60)

The invention relates to improvements of carrying out the Ehrhardt process for manufacturing seamless hollow bodies from square shaped prismatic billets by means of a forging machine as described in my copending application Serial No. 654,523, filed January 31, 1933.

The object of the invention is to provide means for facilitating the insertion of separate prismatic billets into the machine between the former halves of the clamping jaws.

To this end the invention consists in a support for the prismatic billet, which support having a horizontal upper surface in such a manner that this surface lies in a plane tangential to the chamber half of the clamping jaws.

According to one embodiment of the invention the support is formed by a projection of or attachment to one, for instance the stationary clamping jaw, which, when the jaws are closed enters a recess of the other jaw. To avoid a different shape resulting from a construction of the support as part of one jaw and arrangement of a recess in the other jaw according to another embodiment the projections and recesses are provided diametrically opposite to one another on and in the two jaw parts.

A further embodiment of the invention consists in arranging a movable plate as support, adapted to be moved at right angles to the plane of divided former halves, or in arranging of a lever, adapted to swing in a plane vertical to the plane of division of the jaws.

The drawings illustrate several typical embodiments of the invention in cross sections through the jaws of the forging machine. The cross sections run approximately through the middle of the longitudinal axis of the jaws which, in known manner, are let into the clamping jaws of the forging machine and are fixed therein.

In all instances $d_3$ denotes the fixed half of the clamping jaws $d_3$, $d_4$ carrying the former portion $k_1$, the movable parts $d_4$ of the clamping jaws carrying the other half $k_2$ of the former.

Figure 1:
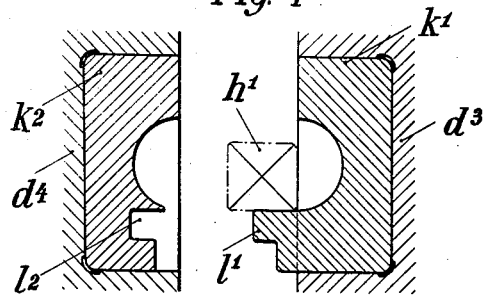
Figure 5:
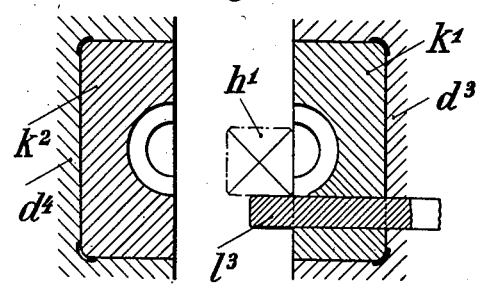
Figure 2:
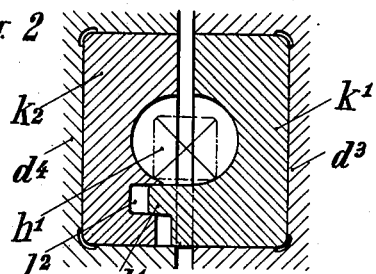
Figure 6:
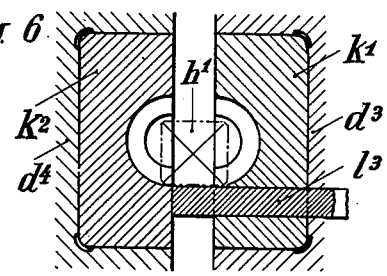

Fig. 1 shows the stage in which, after one cycle of operation of the forging machine the clamping jaws are open. The movable part $d_4$—$k_2$ has moved away from the stationary parts $d_3$ $k_1$ into its extreme lateral position. The former half $k_1$ is provided with a projection $l_1$ the horizontal working surface of which lies tangentially to the cylindrical recess of the former. This working surface serves to support the work as will be fully described in the following. A recess $l_2$ corresponding in shape, dimensions and position to the projection $l_1$ is provided in the movable former half $k_2$. The projection $l_1$ has such a width that the work $h_1$ may, as shown in dotted lines, rest flat upon it or may be shifted upon it by means of a feed channel. The length of the projection $l_1$ along the side of the former $k_1$ is equal to the length of the greatest work to be pierced in the forging machine. Fig. 2 illustrates another position of the matrix formed by the clamping jaw parts $d_3$, $d_4$ and the former parts $k_1$, $k_2$ according to which the two halves $d_3$, $d_4$ have been partially moved toward each other. The projection $l_1$ has partially entered the recess $l_2$ and has been moved beneath the lower boundary of the moulding hole in the movable half $k_2$ of the former $k_1$, $k_2$. The lower longitudinally extending blunted edge, limiting the hole in the former half $k_2$, has reached the work $h_1$ and pushed it laterally into the hole of the fixed half $k_1$ of the former. By the cooperation of the lower limiting edges of the holes in the two former halves $k_1$, $k_2$ the work $h_1$ has already been lifted somewhat.

Figure 3:
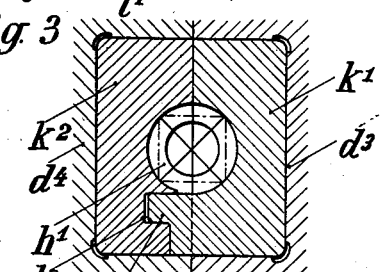
Figure 7:
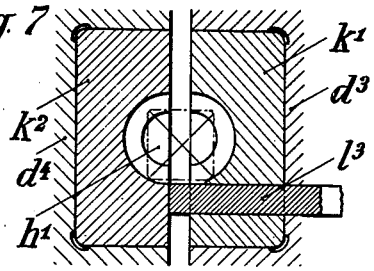

Fig. 3 shows the position of the several parts after completion of a cycle of operations. The projection $l_1$ of the former $k_1$ inserted in the fixed half $d_3$ of the clamping jaws is completely housed in the recess $l_2$ of the other former half $k_2$. In this position the projection $l_1$ serves as a support for the lower edge limiting the hole in the former half $k_2$. The work $h_1$ has been moved upwards along the walls of the cylindrical hole provided by the formers $k_1$, $k_2$ and now occupies the central position in the matrix in which the axis of the work $h_1$ that of the hole of the formers $k_1$, $k_2$ and that of the mandrel $c$ coincide. The mandrel $c$ in this position of the several parts is, by the movement of the slide $b$ introduced into the heated work $h_1$ for piercing it in the manner described above.

Figure 4:
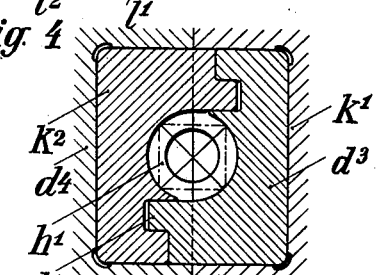
Figure 8:
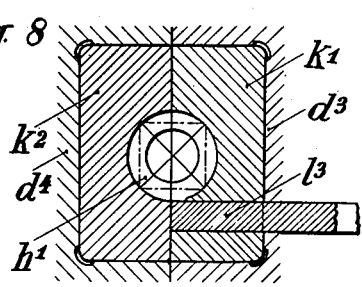

Fig. 4 illustrates a modification of the construction shown in Figs. 1–3. As will be seen each half $k_1$ and $k_2$ of the formers is provided with a projection $l_1$ and a recess $l_2$, the arrangement being such that above the holes in the former halves $k_1$, $k_2$ the projection and the corresponding recess have a position diametrically opposite to the equivalent means below the hole of the formers. This construction has the advantage, that the formation of ridges, due to radially and laterally acting forces upon the matrix, is absolutely prevented, because the unavoidable slits at both the lower and upper line of division of the formers $k_1$, $k_2$ are closed by the pair of interengaging projections and recesses.

A further advantage of this construction is to be considered in this, that the two former halves become absolutely equal, so that one half may be exchanged for the other.

According to Figs. 5-8 a slot is provided in the fixed halves $d_3$ and $k_1$ of the matrix and of the former respectively, whereas in the movable half $k_2$ of the former no recess is present. The slot in the fixed parts of the matrix serves to receive a prismatic flat member $l_3$ which after opening of the matrix may mechanically or by hand be brought into the position shown in Fig. 5. The portion of the flat member $l_3$ projecting beyond the lower line of division of the matrix forms a temporary support for the work $h_1$. When the two halves $d_3$ and $d_4$ of the clamping jaws are moved against each other as explained above, the member $l_3$ is, as may be seen from Figs. 6-9, pushed to the outside of the fixed jaw half $d_3$ by contact with the inner wall of the movable half $d_4$. During this shifting of the member $l_3$ the work $h_1$ is brought into contact with the inner walls of the holes in the former halves $k_1$, $k_2$ so that it is shifted, lifted and centred in the manner described with reference to Figs. 1-4 before the mandrel $c$ reaches the work $h_1$ for piercing the same.

Instead of shifting the member $l_3$ directly by the movable half $d_4$ of the clamping jaws a gearing may be provided which returns the member $l_3$ in dependence upon the movement of the jaw half $d_4$. The movement of the member $l_3$ may also occur with a lead with regard to that of the matrix half $d_4$, $k_2$.

Figure 9:
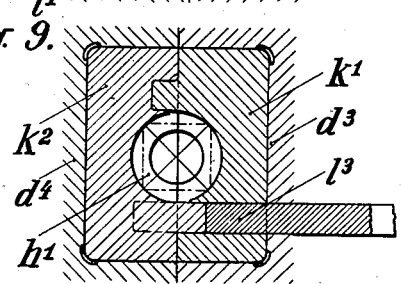

In this construction also the two halves $k_1$, $k_2$ of the former may be made to correspond to each other. As illustrated in Fig. 9 each half of the former may, as indicated in Fig. 4, be provided with a projection and a recess for the reception of the former. In this case, however, the projection is somewhat shorter than in Fig. 4 and consequently the recess also is not as deep as in the construction shown in Fig. 4. The effect of these interengaging projections and recesses is the same as described above.

According to a further modification of the construction last described, the member $l_4$ forming the support for the work $h_1$ is, as shown in Figs. 10-15, in the form of a lever $n$ pivoted upon a pin $m$ carried by a horizontally movable plate $o$. The former half $k_1$ inserted in the fixed half $d_3$ of the clamping jaws is in this case cut away at its lower end to provide a space for the reception of the plate $o$. The fixed half $d_3$ of the clamping jaws also is cut away at its lower end and the lower edge of this jaw part does not extend downwardly as far as the lower edge of the former half $k_1$. This latter edge forms an inclined surface $k_3$.

At the beginning of the forging operation, the parts of the matrix occupy the position shown in Fig. 10 in which a cam $n_1$ carried by the upper surface of the lever $n$ contacts with the inclined plane $k_3$ of the lower edge of the former half $k_1$, so that the lever $n$ substantially lies in a horizontal plane and its supporting surface $l_4$ assumes the position for receiving and working the work $h_1$. When now, as illustrated in Fig. 11, the movable half $d_4$ of the matrix is shifted towards the half $d_3$, it contacts with the projecting end of the lever $n$ pushing it back and thereby bringing the corners of the lower surface of the work $h_1$ into contact with the inner cylindrical walls of the holes provided in the formers $k_1$ and $k_2$. On further movement of the jaw half $d_4$ in the same direction, the work $h_1$ is, as will be seen from Fig. 12 supported by the formers $k_1$ and $k_2$ only as the cam $n_1$ of the lever $n$ has come out of engagement with the lower surface of the former $k_1$ so that the end of said lever carrying the support $l_4$ for the work $h_1$ may swing downwardly until it rests against the lower surface of the former $k_1$. When finally the former half $k_2$ contacts with the fixed half $k_1$ as illustrated in Fig. 13 the lever $n$ and the plate $o$ are further shifted rearwardly to the position shown in Fig. 13, whereupon the mandrel enters the now properly centred work $h_1$ to perform the piercing in the manner described above.

As shown in dotted lines in Fig. 13 in this construction also the two halves $k_1$, $k_2$ of the former may be made of the same shape, so that they also may, if desired, be exchanged against each other.

According to the modification shown in Figs. 14 and 15, the formers $k_1$, $k_2$ used in the construction illustrated in Figs. 10-13 may be provided with longitudinally extending projections and corresponding recesses at diametrically opposite points so as to secure the advantages mentioned above, i. e. to cover the slit between the end surfaces of the formers $k_1$, $k_2$, to support or reinforce the thin edges limiting the semi-cylindrical holes in the formers and to maintain the proper position between the relatively movable parts of the matrix.

By means of the process and the arrangements described above seamless hollow bodies from iron or steel may be manufactured in a forging machine in a single operation or in two or more successive steps. In this way the difficulties connected with the employment of hydraulic presses and the accessories necessarily used with them are avoided which increase the cost and delay the manufacture and delivery of the products.

I claim:—

1. A die for automatically working mechanical forging machines for manufacturing seamless hollow bodies, comprising two-part jaws having a cylindrical former chamber therein adapted to receive a square-shaped prismatic billet, one part of the jaw halves having in its lower part a cut-out portion with an inclined guide on its upper side and a pivot for a lever forming on the one end a support and a slide for the billet projecting between the former halves when being opened, and having a cam on the other end of the lever adapted by its contact with the inclined surface to swing the support vertically when closing and opening the two chamber parts.

2. A die for automatically working mechanical forging machines for manufacturing seamless hollow bodies, comprising a two-part clamping jaw having a cylindrical former chamber therein adapted to receive a square-shaped prismatic billet, one part of the jaw halves having on the lower end an inclined surface on the upper surface of a cut-out portion, and a pivoted lever in the cut-out portion forming a support and a slide for the billet on the one lever end projection between the opened jaw halves, and having a cam on the other lever end adapted to contact with the inclined surface to swing the support vertically when closing and opening the two jaw parts, each of said jaw halves having diametrically opposite to one another and tangentially to the cylindric hole of each jaw part, a projection cooperating with a like formed recess in the other part of the jaw the projection entering said recess during the closing of the jaw halves thus covering the slits between the closed halves of the former chamber in the die.

3. A die for automatic forging machines for making seamless hollow forgings by piercing solid billets of square cross-section comprising a die body vertically divided to form a pair of jaws defining in their closed position a cylindric forming chamber symmetric about the plane of division and adapted to receive a prismatic billet having a diagonal dimension equal to the diameter of the cylindrical chamber, means for supporting the prismatic billet between said jaws when open, said means having a plane bearing face for the billet lying at the level of and extending parallel to lines defining the lower boundaries of the semi-cylindrical halves of the chamber wall, and guide means in the die body wherein said support means can enter and slide during the closing of the jaws and the transfer of the billet from the supporting means to the chamber.

4. A die for automatic forging machines for making seamless hollow forgings by piercing solid billets of square cross-section comprising a die body vertically divided to form a pair of jaws defining in their closed position a cylindric forming chamber symmetric about the plane of division and adapted to receive a prismatic billet having a diagonal dimension equal to the diameter of the cylindrical chamber, and means for supporting the prismatic billet between said jaws when open, said means consisting of a projection at the bottom of one of said jaws having a plane horizontal bearing face for the billet extending tangential to the cylindrical wall of the chamber at the line of intersection with said wall of the vertical plane through the axis of the cylindrical chamber and a recess in the bottom of the other jaw into which said projection can enter and slide during the closing of the jaws and the transfer of the billet from the supporting means to the chamber.

5. A die according to claim 4 including a second projection and complementary recess in said jaws similar to these forming the billet supporting means but arranged above the cylindric chamber.

6. A die for automatic forging machines for making seamless hollow forgings by piercing billets of square cross-section comprising a die body vertically divided to form a pair of jaws defining in their closed position a cylindric forming chamber symmetric about the plane of division and adapted to receive a prismatic billet having a diagonal dimension equal to the diameter of the cylindrical chamber, and means for supporting the prismatic billet between the said jaws when open, said means consisting of a plate horizontally movable in a slot traversing one of the jaws, said plate having its upper face horizontal and tangential to the cylindric chamber wall at the bottom thereof and when the jaws are open projecting across the gap between them and cooperating with the lower part of the opposite jaw during closing of the jaws to simultaneously transfer the billet to the chamber and to be retracted into the slot.

7. A die according to claim 6 including a projection and a complementary recess in said jaws below the cylindrical die chamber the projection being in alignment with the plate and having an upper plane horizontal face tangential to the cylindrical chamber wall at the bottom thereof.

8. A die according to claim 6 including a projection and a complementary recess in said jaws above the cylindric die chamber the projection having a lower plane horizontal face tangential to the cylindrical chamber wall at the top thereof.

9. A die for automatic forging machines for making seamless hollow forgings by piercing solid billets of square cross-section comprising a die body vertically divided to form a pair of jaws defining in their closed position a cylindric forming chamber symmetric about the place of division and adapted to receive a prismatic billet having a diagonal dimension equal to the diameter of the cylindrical chamber, and means for supporting the prismatic billet between said jaws when open, said means consisting of a lever mounted in a slot in one of the jaws and provided with a plane billet supporting face capable of lying in a horizontal plane tangential to the cylindrical chamber wall at the bottom thereof when said jaws are open, said slot having inclined guide surfaces cooperating with a part of the lever during closing of the jaws to cause said lever to be retracted within the slot as the support of the billet is transferred from the lever to the chamber.

10. A die according to claim 9 including a projection and a complementary recess in said jaws above the cylindric die chamber the projection having a lower plane horizontal face tangential to the cylindrical chamber wall at the top thereof.

11. A die according to claim 9 including a projection and a complementary recess in said jaws below the cylindric die chamber the projection having a lower plane horizontal face tangential to the cylindrical chamber wall at the top thereof.

MORITZ GRÜNTHAL.